United States Patent
Leglise

[15] 3,639,823
[45] Feb. 1, 1972

[54] FINE AND COARSE POSITION CONTROL DEVICE

[72] Inventor: Alexandre Leglise, Montignies-le-Tilleul, Belgium

[73] Assignee: Acec Ateliers De Constructions Electriques De Charleroi, Charleroi, Belgium

[22] Filed: Nov. 19, 1969

[21] Appl. No.: 878,131

[30] Foreign Application Priority Data

Nov. 18, 1968 Belgium..............................PV66.321

[52] U.S. Cl.............................................318/595, 318/603
[51] Int. Cl.......................................................G05b 11/18
[58] Field of Search..................................318/595, 594, 603

[56] References Cited

UNITED STATES PATENTS

| | | | |
|---|---|---|---|
| 2,785,353 | 3/1957 | Fenemore............................318/594 |
| 2,947,929 | 8/1960 | Bower...................................318/603 X |
| 3,950,427 | 8/1960 | Tripp....................................318/594 X |
| 3,020,460 | 2/1962 | Morin et al. .........................318/594 |
| 3,093,777 | 6/1963 | Kroninger............................318/595 |
| 3,117,263 | 1/1964 | MacDonald..........................318/594 |

Primary Examiner—T. E. Lynch
Attorney—Raymond A. Robic

[57] ABSTRACT

A device for governing the speed of a mobile member comprising: fixed indexing means located on the path of said mobile member; means located on said mobile member for detecting said indexing means; a variable speed motor located on the mobile member and operating a device for driving said mobile member, said motor being connected to a fixed portion of said position control device by means of flexible cables; a coarse measuring device responsive to said detecting means and including a coarse error voltage generator for generating a voltage proportional to the difference between a predetermined final position of said mobile member and the position actually occupied by said mobile member measured in coarse units, said coarse measuring device providing a constant speed control voltage to said motor; a fine measuring device coupled to the motor driving said mobile member and providing a decreasing speed control voltage for said motor; a commutator for replacing said constant speed control voltage applied to said motor by said decreasing speed control voltage; and means responsive to said coarse measuring device for detecting that said mobile member is approaching its final position and for operating said commutator.

9 Claims, 10 Drawing Figures

INVENTOR
Alexandre LEGLISE

ATTORNEY

FINE AND COARSE POSITION CONTROL DEVICE

This invention relates to a position control device for governing the speed of a mobile member as it is approaching a predetermined final position.

In a known device for controlling the position of a single mobile member along a predetermined path, the speed control voltage applied to the motor driving the mobile member is governed by means of a commutator which permits the passage from a constant speed control voltage provided by a device giving a coarse indication of the position of the mobile member, to a decreasing speed control voltage provided by a device giving a fine measurement of such position and comprising a synchro-system including a generator and a receiver producing a fine error sinusoidal voltage proportional to the difference between the predetermined final position of the mobile member and the position that such mobile member occupies at a predetermined time. In such a known device, the coarse measuring device is a preselection counter which counts the turns of the synchro-generator. The half-periods of the sinusoidal error voltage consequently represent the coarse error measuring units. The speed control voltage of this known device, which is governed by the coarse measuring device, remains constant as long as the preselection counter does not indicate zero. When the mobile member is approaching its predetermined final position, the counter indicates zero and, at this moment, causes the above-mentioned commutator to operate, which permits to replace the constant speed control voltage by the sinusoidal decreasing speed control voltage. A known device of this type is disclosed in U.S. Pat. No. 2,861,232 and is particularly useful for controlling the tool holder of a digital controlled lathe in which the tool holder is displaced by a master worm to which is coupled the synchro-generator. A particular characteristic of this known position control device is the fact that the coarse measuring device is displaced along the path of the mobile member depending on the position of the synchro-receiver. This simplifies greatly the control device but, on the other hand, is responsible for the fact that this known device does not memorize the coarse position of the mobile member.

The control device in accordance with the invention may replace the above described synchro-system but it is particularly used, for example, for controlling plural tool holders on a single scoring beam for cutting glass, or for controlling the displacement along a same path of plural pulley blocks in automatic stores, automatic parkings, or furnace loaders, etc. That which characterizes the above uses of the control device of the invention is the fact that on a same path plural mobile members, that is two loaders or pulley blocks, etc., may be displaced at the same time and independently providing that they do not cross each other. Consequently, a faithful memorization of at least the coarse position of each mobile member is required, which is not the case, at the time of a cutoff of the current, in the above disclosed known system.

The position control device for controlling a mobile member along a predetermined path, in accordance with the invention, uses certain characteristics of the known position control device in the sense that the speed control voltage for the motor driving the mobile member is governed by means of a commutator which permits the passage from a constant speed control voltage provided by a device measuring the coarse position of the mobile member, to a decreasing speed control voltage provided by a fine measuring device of such position. The invention is characterized by fixed indexing means positioned along the path of said mobile member, by means located on the mobile member for detecting the position of said indexing means, by a coarse measuring device responsive to said detecting means and including a coarse error voltage generator for generating a voltage proportional to the difference between the final position of the mobile member and the position occupied by the mobile member at a predetermined time and measured in coarse units, by a variable speed motor located on the mobile member and driving said mobile member, said motor being connected to a fixed portion of said position control device by means of flexible cables, by a fine measuring device coupled to the motor driving said mobile member, and by means responsive to the coarse error voltage for detecting that said mobile member is approaching its final position and for controlling the commutator permitting the passage of the motor driving the mobile member from a constant speed to a decreasing speed.

In addition, with the position control device in accordance with the invention, plural mobile members may be displaced along a same path using the same indexing means and each mobile member is equipped with a separate position control device.

The invention will now be disclosed with reference to the accompanying drawings illustrating two preferred embodiments of the invention and in which.

Figure 1:
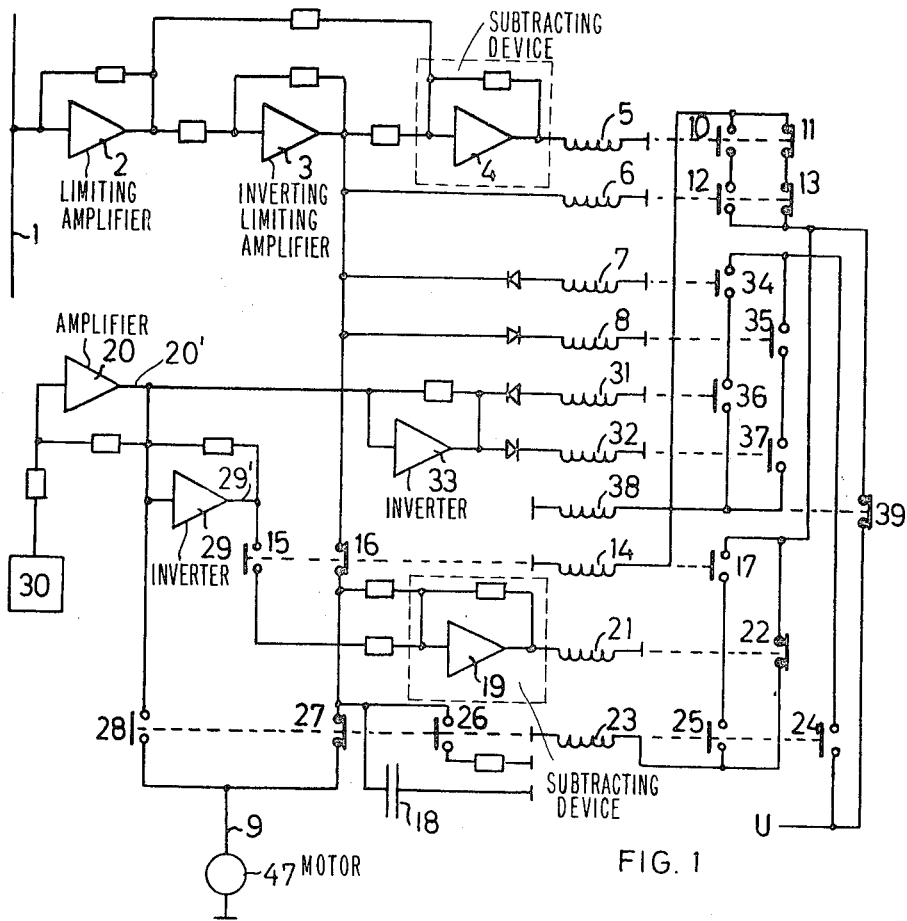
FIG. 1 illustrates a schematic diagram of a first embodiment of a position control device.
Figure 2:
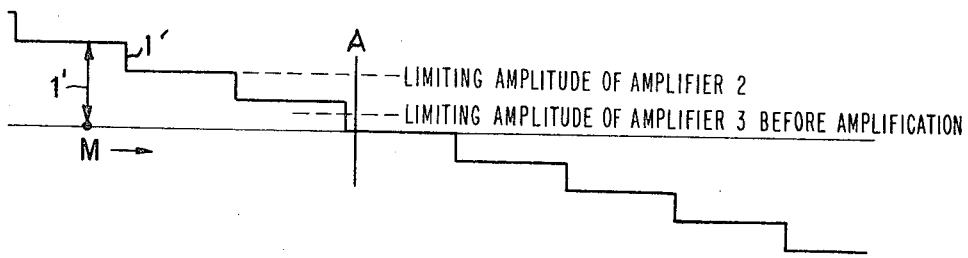
FIGS. 2, 3 and 4 illustrate voltage diagrams in function of the position of the mobile member.

In FIG. 1, a conductor 1 is a voltage 1' illustrated in FIG. 2 and proportional to the difference between the position M occupied by a mobile member, and the predetermined final position A thereof. Such voltage 1' is equal to the difference between a voltage provided by an appropriate device for measuring the position of the mobile member and a control voltage representing the final position towards which the mobile member is moving. Such voltage 1', as illustrated in FIG. 2, varies in steps having a length equal to a coarse measuring unit of the position of the mobile member.

Figure 3:
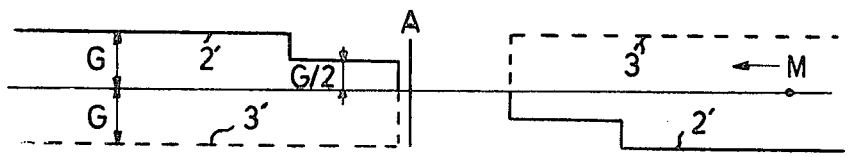

The voltage 1' appearing on conductor 1 is fed to a limiting amplifier 2 with unitary gain, whose limiting amplitude is ±G which produces a voltage 2' illustrated in full lines in FIG. 3 and whose amplitude is constant and equal to G for all the values of the difference between the predetermined final position of the mobile member and the position occupied by such mobile member at a predetermined time, except for the final value (G=0) and for the two adjacent values in which the amplitude of the voltage 2' is equal to G/2. The limiting level ±G of the amplifier 2 could be chosen in such a way that between zero and G appear plural intermediate levels and not only a single level G/2.

The voltage 2' is subsequently fed to an inverting limiting amplifier 3 with high gain and limiting amplitude ±G whose output voltage 3' compensates for the voltage 2' at the input of a third amplifier 4. The voltage 3', as illustrated in FIG. 3, is the speed control voltage of a motor, 47, for driving the mobile member. The amplifier 4 which is also connected to the output of amplifier 2 thus forming a subtracting device provides a zero output voltage for all positions of the mobile member except for the position in which the voltage 2'=G/2. In the last mentioned position, a relay winding 5 is energized. When the voltage 3' is not null, such voltage energizes a relay winding 6 and in addition, in the case where such voltage is negative, a sign detecting relay winding 7 and in the case where such voltage is positive, a sign detecting relay winding 8.

The position control device operates as follows:

When the mobile member M is located far from its predetermined final position A (FIG. 3), to the left, relay windings 5 and 8 are deenergized while relay windings 6 and 7 are energized. When the mobile member is located far from its final position A, to the right, relay winding 8 is energized instead of relay winding 7. When the mobile member enters, either from the left or from the right, into the zone defined by the fact that voltage 2' is reduced to G/2 (FIG. 3), relay winding 5 is energized. The relay windings 5 and 6 operate four contacts 10, 11 and 12, 13 respectively thus energizing relay winding 14. If relay windings 5 and 6 are both energized (in the zone where voltage 2'=G/2) or are both deenergized (zone in which voltage 2'=0), relay winding 14 is energized and operates three contacts 15, 16 and 17. The contact 16 permits to disconnect one of the inputs of an amplifier 19 located in the output of the limiting amplifier 3. However, the value of voltage 3' is maintained at the input of amplifier 19 by capacitor 18 which is fully charged. The closure of contact 15 introduces into the input circuit of amplifier 19 a voltage 29' having a maximum amplitude equal to the amplitude of voltage 3'. The voltage 29' is generated by an inverting amplifier 29 and is of a polarity opposite to that of a voltage 20' which appears at the output of am amplifier 20 and constitutes the decreasing speed control voltage 20'. Because of that, the output voltage of amplifier 19 which acts as a subtracting device is null only when the mobile member is located either to the left of the final position A at a location where the voltage 20' is at a maximum negative value, or is located to the right of the final position A at a location where the voltage 20' is at a maximum positive value and equal in both cases to the voltage 3'. A relay winding 21 which is fed by such output voltage therefore remains energized as long as voltages 3' and 20' are different. The relay winding 21 operates contact 22. When such contact 22 is closed, a relay winding 23 is energized operating contacts 24, 25, 26, 27 and 28. Since at this moment, relay winding 14 is energized and contact 17 closed, the contact 25 locks relay winding 23 in operating position. The closure of contact 28 and the opening of contact 27 cause the speed control voltage appearing on conductor 9, which previously was at the constant voltage 3', to be replaced by the decreasing speed control voltage 20'. The capacitor 18 is grounded by the closure of contact 26. The contact 24 applies a voltage U to a starting circuit to be disclosed later.

Figure 4:
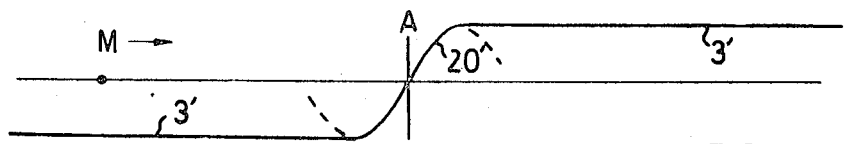

FIG. 4 illustrates how the speed control voltage on conductor 9 varies with the displacement of the mobile member when the final position is located at A.

Figure 5:
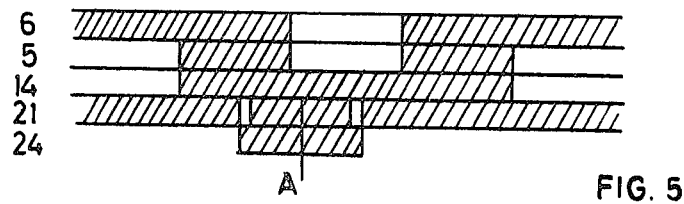
FIG. 5 is a diagram illustrating the operation of various relays of FIG. 1.

FIG. 5 illustrates by means of hatched areas at which locations of the mobile member the relay windings 6, 5, 14, 21 and 23 are energized for the case illustrated in FIGS. 3 and 4. The relay winding 6 is energized for all positions of the mobile member except for the coarse position A (voltage 2'=0). The relay winding 5 is energized only at the two coarse positions located on either sides of final position A (voltage 2'=G/2). Because of contacts 10, 11 and 12, 13 operated by relay windings 5 and 6, the relay winding 14 is energized when the two relay windings 5 and 6 are simultaneously energized or deenergized. The relay winding 14 constitutes therefore the principal element of a means for detecting that the mobile member is approaching the final position A. When, at this moment, contact 16 is opened, the speed control voltage on the conductor 9 is maintained because of capacitor 18 and the voltage 29', or which is the same the voltage 20' inverted by the amplifier 29, is applied to amplifier 19. The latter controls the deenergization of relay winding 21 when voltages 3' and 20' are equal, which causes the energization of relay winding 23 and the replacement of the constant voltage 3' by the decreasing voltage 20' on the conductor 9 through contacts 28 and 27. The voltage 20' becomes null when the mobile member reaches the final position A, thus causing the stopping of the mobile member at such position.

The voltage 20' is the sinusoidal error voltage of a synchrosystem including a generator and a receiver. To permit a smooth positioning of the mobile member, a movement of the mobile member corresponding to a complete revolution of the synchro-generator corresponds to two coarse measuring units as represented by the steps of voltage 1' of FIG. 2. The synchro-system is not disclosed but is represented by discriminator 30 which normally forms part of such synchrosystem. A system suitable may be, for example, the one disclosed in U.S. Pat. No. 2,783,422 because it permits to position the synchro-receiver by means of push buttons.

When very small displacements of the mobile member are required, it becomes necessary to distinguish between displacements measuring less than one coarse measuring unit, or between one and two coarse measuring units, or which is the same between one and two half-periods of the sinusoidal voltage 20'.

Figure 6:
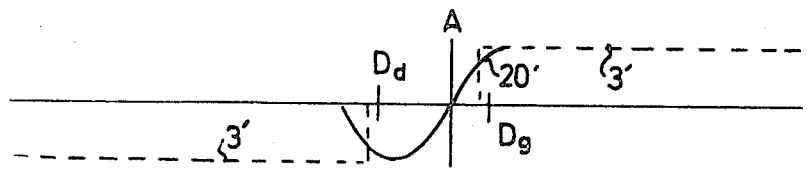
FIGS. 6 and 7 illustrate other voltage diagrams in function of the position of the mobile member.

For displacements which are less than one coarse measuring unit, the system operates without difficulty because, as illustrated in FIG. 6, if the mobile member is located at one of the locations $D_g$ or $D_d$, the decreasing speed control voltage 20' causes the operation of the motor 47 driving the mobile member either towards the right or towards the left always in the direction of point A.

Figure 7:
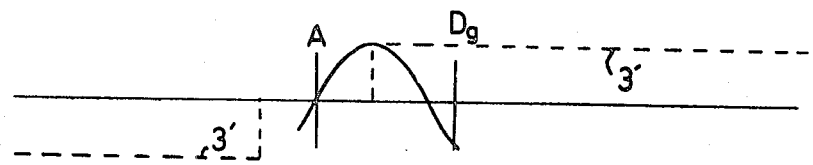

Such is not the case, as illustrated in FIG. 7, when the point of departure $D_g$ is distant from point A by a distance located between one and two coarse measuring units. In this case, the decreasing speed control voltage 20' would cause the mobile member to move in a direction which is opposite to the location of point A. To prevent such departure in the opposite direction, a special starting circuit is provided. Such starting circuit comprises two relay windings 7 and 8 which detect the sign of the voltage 3' and two relay windings 31 and 32 which detect the sign of voltage 20' amplified by a sign inverting amplifier 33. When the voltages 3' and 20' are of the same sign, relay windings 7 and 32 close contacts 34 and 37, or relay windings 8 and 31 close contacts 36 and 35. In none of these cases is a relay winding 38, which operates a contact 39, energized even if contact 24 of relay winding 23 is closed. On the contrary, if the voltages 3' and 20' are of opposite signs, either windings 7 and 31 close contacts 34 and 36 or relay windings 8 and 32 close contacts 35 and 37, thus causing the energization of relay winding 38 which opens contact 39 and causes the deenergization of relay windings 14 and 23 by interrupting the connection to control voltage U. At this moment the speed control voltage for the motor driving the mobile member appearing on conductor 9 consists of the constant voltage 3'.

When the mobile member must be moved from point $D_g$ towards the point A, the relay windings 8 and 32 are energized, as well as the relay winding 38. The latter opens contact 39 which opens the energization circuit of relay winding 14 thus permitting the closure of contact 16 and, consequently, the charging of capacitor 18 up to the voltage 3'. At the moment when the voltage 20' is at zero potential the relay winding 32 is deenergized and relay winding 38 is also deenergized and permits the decreasing speed control voltage to bring the mobile member to a stop at point A as described above. Indeed, the speed control voltage 3' is replaced by the identical voltage appearing on the terminals of capacitor 18 until the moment when voltages 29' and 3' are equal. At this moment relay winding 21 is deenergized for a moment and operates relay winding 23. The latter locks operated (contacts 26 and 28 closed and 27 open) and replaces the constant speed control voltage 3' by the decreasing speed control voltage 20'.

Figure 8:
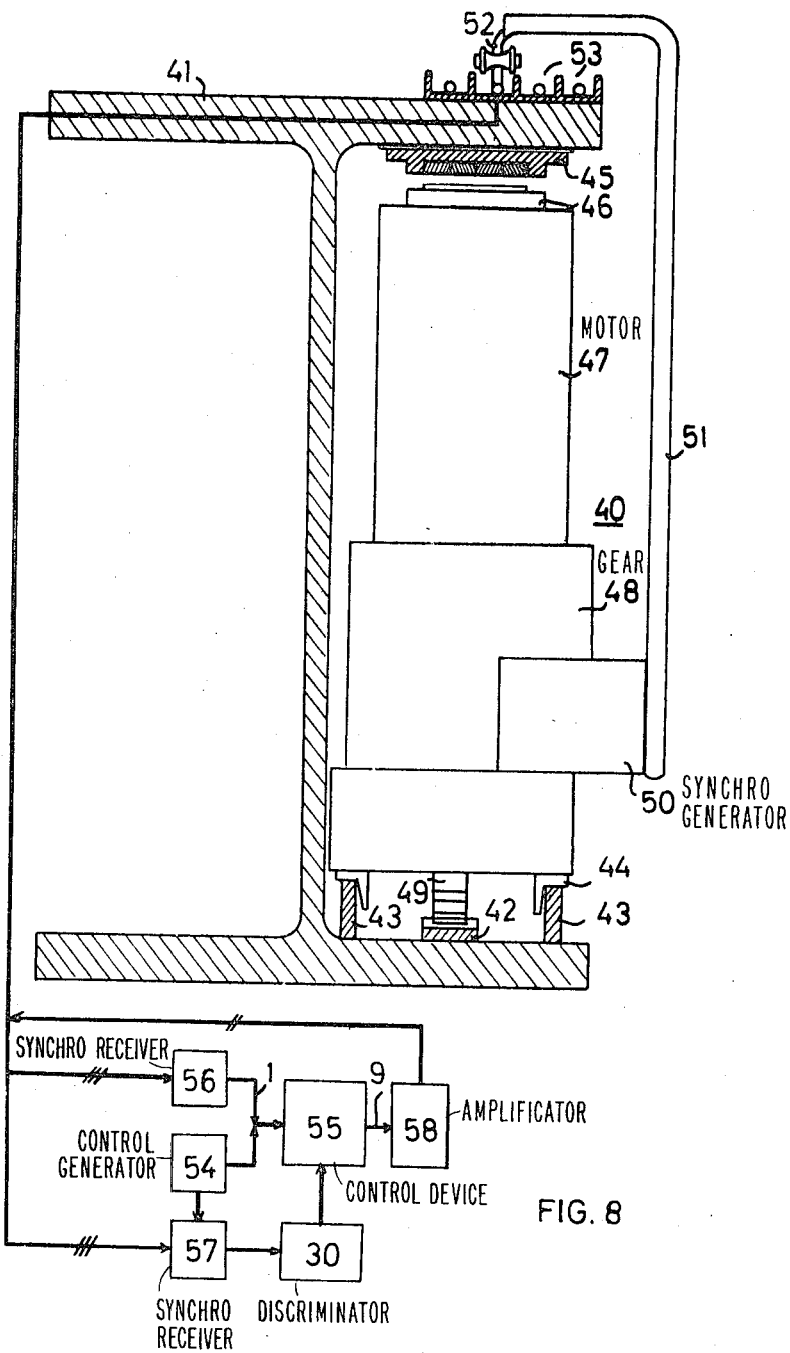
FIG. 8 illustrates a mobile member which is displaced along a path defined by a beam.

FIG. 8 illustrates a mobile member 40 which may be displaced along a path defined by a beam 41. On the beam 41 are located a rack 42, two rail supports 43 for supporting wheels 44 of the mobile member 40, and a coded ruler 45 providing a coarse measure indexing the rack 42 and the rails 43. Such ruler 45 may be coded according to the Gray code with, as represented, four binary tracks. On the mobile member 40 is located a reading device 46 for coded ruler 45. If as in the example shown the coded ruler 45 includes four tracks, the reading device 46 is composed of four reading heads. The mobile member is equipped with a driving motor 47 and with a speed reducer 48 connected to motor 47 and coupled, on the one hand, to a toothed wheel 49 engaging with rack 42 and, on the other hand, with a synchro-generator 50. A hollow arm 51 permits to effectuate the electrical connection to the mobile member 40. At the free end of arm 51 is fixed the end of a flexible conductor 52 disposed in a channel 53. In the embodiment in accordance with FIG. 8, plural mobile members may be displaced along the same path or along the same beam 41 so that plural channels 53 are provided, each containing a flexible conductor for each mobile member. The other end of the flexible member is connected to a control station. Each such control station, which is installed at a fixed location, comprises a control generator 54 such as for example a multiple contact switch assembly, each switch having ten positions; the number of switches corresponds to the number of significant decimals characterizing the positions of the mobile member.

The control generator 54 may be replaced by the peripheral equipment of a digital computer which would perform the calculation of the coordinates of the mobile members holding scoring tools, for example, to ensure optimum cutting of glass taking into account, on the one hand, the dimensions required depending on the order and, on the other hand, the coordinates of the defects on the glass sheet which coordinates would be previously fed into the computer.

The output of control generator 54 is connected, on the one hand, to conductor 1 of a position control device 55 constructed, for example, in accordance with FIG. 1 concerning the generation of the significant decimals relating to the coarse measuring of the position of mobile member 40 and, on the other hand, to a synchro-receiver 57 so as to feed thereto the information relating to the significant decimals of the fine measuring of the position of the mobile member.

The four output signals of reading device 46 are fed to a decoder 56. If the ruler 45 is coded according to the Gray code, the decoder 56 may be a device such as disclosed in Belgian Pat. No. 721,921. The output of decoder 56 representing the coarse measure of the position of the mobile member is also applied to conductor 1.

The synchro-generator 50 is connected to the synchro-receiver 57 which is itself connected to discriminator 30.

The output conductor 9 of the position control device 55 is connected to an amplification stage 58 to the output of which are connected the conductors controlling driving motor 47.

In the circuits illustrated in the schematic diagram of FIG. 1, relays have been illustrated for effecting the various switching operations. It is obvious that logic elements such as disclosed in Belgian Pat. No. 587,827 or other electronic elements accomplishing the same purpose could be used in place of relays.

Figure 9:
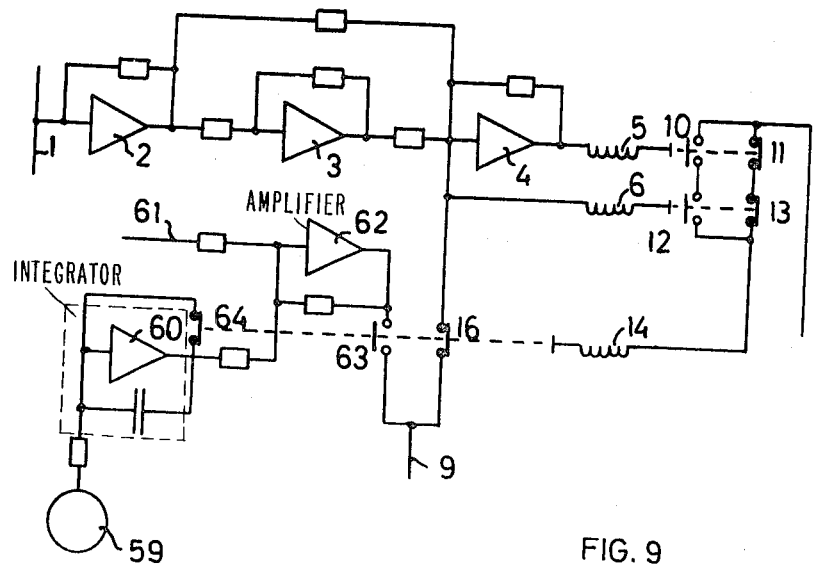
FIG. 9 illustrates a second embodiment of a position control device.
Figure 10:
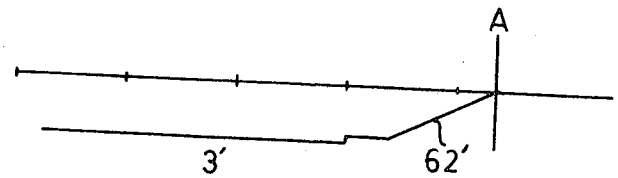
FIG. 10 illustrates another voltage diagram in function of the position of mobile member controlled by the position control device of FIG. 9.

When a faithful memorization of the position of the mobile member is required only for the course positioning of a mobile member, the fine measuring device may be composed of, as illustrated in FIG. 9, a tachometer generator 59 coupled to the motor driving the mobile member and the output voltage of such tachometer generator may feed to an integrator 60. The output of the integrator 60 is compared to a fine position control voltage appearing on a conductor 61 and fed to a limiting comparator 62. The output voltage 62', as illustrated in FIG. 10, of the limiting comparator 62 is a constant voltage up to the point where it becomes a decreasing voltage at a predetermined moment when the difference between the output voltage of the integrator and the control voltage appearing on conductor 61 is smaller than the limiting level of comparator 62. In order to distinguish more easily the two voltages 3' and 62' on FIG. 10, the constant portion of voltage 62' is represented by an amplitude which is smaller than the amplitude of voltage 3'. In fact, these two amplitudes are generally equal.

The position control device in accordance with FIG. 9 operates as follows:

The relay winding 14 is energized in the same conditions as the relay winding 14 of the device according to FIG. 1. In the present embodiment, the relay 14 operates three contacts 16, 63, and 64. The contact 16 opens the circuit between amplifier 3 and conductor 9. The contact 63 closes the circuit between the comparator 62 and the conductor 9. The contact 64 opens the short circuit across the integrator 60. It follows that when relay winding 14 is energized, the constant speed control voltage 3' is replaced by the voltage 62' which from a predetermined moment starts to decrease to reach the amplitude zero at the time when the mobile member reaches the final position A. The time when the voltage 62' starts to decrease depends on the limiting level of amplifier 62.

I claim:

1. A position control device for governing the speed of a mobile member comprising:
   a. fixed indexing means located along a path traversed by said mobile member for providing a coarse coordinate of the location of said mobile member;
   b. means located on said mobile member for detecting the coarse coordinate of said indexing means;
   c. a variable speed motor located on the mobile member and driving said mobile member, said motor being connected to a fixed portion of the position control device by means of a flexible cable;
   d. coarse measuring means responsive to said coarse detecting means for generating a coarse error voltage proportional to the difference, measured in coarse units, between the final position of said mobile member at a predetermined time, said coarse measuring means generating a constant speed control voltage to said motor;
   e. fine measuring means connected to said motor and generating a decreasing speed control voltage to said motor;
   f. means responsive to the coarse error voltage measured by said coarse measuring means for detecting when said mobile member is approaching its final position; and
   g. a commutator connected to said coarse and fine measuring means and responsive to said final approach detecting means for replacing said constant speed control voltage which is applied to said motor by said decreasing speed control voltage.

2. A position control device for governing the speed of a plurality of mobile members, comprising:
   a. a single path for a plurality of mobile members;
   b. a single fixed indexing means located on said single path for providing coarse coordinates for said mobile members on said single path;
   c. a plurality of means, each one located on one of said plurality of mobile members for detecting the coarse coordinate of an associated mobile member;
   d. a plurality of variable speed motors, each one located on one of said mobile members and driving said one member, each said motor being connected to a fixed portion of the position control device by means of a flexible cable;
   e. a plurality of coarse measuring means, each connected to one of said plurality of coarse coordinate detecting means for generating a coarse error voltage proportional to the difference, measured in coarse units, between the final position and the effective position of the associated mobile member, said coarse measuring means generating a constant speed control voltage for the motor of the associated mobile member;
   f. a plurality of fine measuring means, each one coupled to one of said plurality of motors driving the associated mobile members, each one of said fine measuring means providing a decreasing speed control voltage for the motor of the associated mobile member;
   g. a plurality of means, each one responsive to the coarse error voltage of an associated coarse measuring means, for detecting that said mobile member is approaching its final position; and
   h. a plurality of commutators, each one connected to a coarse measuring means and a fine measuring means and responsive to associated final approach detecting means of the associated mobile member and connected to the associated motor for replacing said constant speed control voltage by said decreasing speed control voltage.

3. A position control device as defined in claim 10, wherein said fine measuring means comprises a synchro-system including a synchro-generator and a synchro-receiver, said synchro-generator being coupled to said motor driving the mobile member and said synchro-receiver being arranged to provide the decreasing speed control voltage, a complete revolution of said synchro-generator corresponding to a displacement of said mobile member by two coarse units defined by said indexing means.

4. A position control device as defined in claim 1 wherein said last mentioned means includes a starting device responsive to the sign of the coarse error voltage and to the sign of the decreasing speed control voltage generated by said fine measuring means, said starting device comprising locking means controlling said commutator to maintain said commutator to a position in which the constant speed control voltage is applied to the motor when there is a difference between said signs.

5. A position control device as defined in claim 10, wherein said fine measuring means consists of a tachometer generator coupled to said motor driving the mobile member, and further comprising an integrator connected to the output of said tachometer generator, and a comparator connected to the output of said integrator for comparing the output of said integrator to a predetermined fine position control voltage.

6. A position control device as defined in claim 10, wherein said indexing means is a coded ruler indexing the path on which said mobile member is displaced, and wherein said detecting means is a decoder connected to the coarse measuring means.

7. A position control device as defined in claim 10, further comprising a limiting amplifier to which is applied the coarse error voltage and at the output of which appears the constant speed control voltage of the motor driving the mobile member.

8. A position control device as defined in claim 10, wherein the path on which is displace the mobile member is a rack and further comprising a toothed wheel engaging said rack and driven by said motor.

9. A position control device as defined in claim 10, wherein the means for detecting that said mobile member is approaching its final position, comprises:

a. a first limiting amplifier responsive to the coarse error voltage for limiting such voltage to a predetermined value;
b. a second limiting amplifier responsive to the output of the first limiting amplifier for limiting the output voltage of the first limiting amplifier to half the above mentioned value, the output of said second limiting amplifier being connected to said commutator which replaces the constant speed voltage applied to the motor by the decreasing speed control voltage;
c. a first subtracting device having one input connected to the output of the first limiting amplifier and a second input connected to the output of the second limiting amplifier;
d. first and second switching means, the first switching means being operated by the output of said first subtracting device and the second switching means being operated by the output of the second limiting amplifier;
e. a third switching means operated by said first and second switching means;
f. fourth and fifth switching means each connected through a diode, one being of the opposite polarity of the other, to the output of the second limiting amplifier;
g. sixth and seventh switching means each connected through a diode, one being oriented in a direction opposite to the other, to the output of said fine measuring device;
h. an eighth switching means controlled by said fourth, fifth, sixth and seventh switching means and itself controlling the operation of the third switching means;
i. a ninth switching means for operating said commutator;
j. a second subtracting device having one input connected to the output of said second limiting amplifier through a normally closed contact of said third switching means; and to the output of said fine measuring device through a normally opened contact of said third switching means;
k. a capacitor connected to the first input of said second subtracting device; and
l. a tenth switching means operated by said second subtracting device, said third, eighth and tenth switching means operating said ninth switching means which controls the operation of the commutator.

* * * * *